ROUNDING OFF MEANS FOR CALCULATING MACHINES

Filed March 11, 1965 4 Sheets-Sheet 1

INVENTOR.
HERMAN GANG
BY [signature]
ATTORNEY

ROUNDING OFF MEANS FOR CALCULATING MACHINES

Filed March 11, 1965 4 Sheets-Sheet 2

INVENTOR.
HERMAN GANG

BY [signature]

ATTORNEY

July 25, 1967 H. GANG 3,332,618

ROUNDING OFF MEANS FOR CALCULATING MACHINES

Filed March 11, 1965 4 Sheets-Sheet 3

INVENTOR.
HERMAN GANG

BY George V. Hall

ATTORNEY

ROUNDING OFF MEANS FOR CALCULATING MACHINES

Filed March 11, 1965 4 Sheets-Sheet 4

INVENTOR.
HERMAN GANG
BY George V. Hall
ATTORNEY

United States Patent Office 3,332,618

Patented July 25, 1967

3,332,618

ROUNDING OFF MEANS FOR CALCULATING MACHINES

Herman Gang, Morris Plains, N.J., assignor to Monroe International Corporation, Orange, N.J., a corporation of Delaware Filed Mar. 11, 1965, Ser. No. 438,852
17 Claims. (Cl. 235—60)

The present invention relates to rounding off means for calculating machines whereby calculations registered in fractions of a unit are rounded off to the nearest whole unit value. Most commonly, rounding off means is operable to round off fractional registration of cents to the nearest cent.

The most usual way of performing the rounding off operation is to condition the product register by means operable to set the value "5" in the order next below the "cents" orders and to reset to this value each time the register is cleared. If the amount added in this order is less than "5" (5 mills), no tens transfer will occur in the next higher or "cents" order. If, however, the amount added is "5" or more, a tens transfer will add "1" in the "cents" order. Accordingly, the total will be rounded off to the closest cent.

Selectively operable means is provided to remove the "5" from the "mills" order for subsequent clearing of that order to "0" with the other orders of the register The register will then be reconditioned for other operations in which rounding off is not applicable. The operator, however, can inadvertently omit the reconditioning operation before performing said other operations and this obviously would result in incorrect calculations.

It will be noted that the above conditioning and reconditioning operations require manual operations by the operator as indicated by his observation of the condition of the register after a clearing operation. These disadvantages are obviously more pronounced in a printing calculator wherein the register is not visible.

It is, therefore, a particular object of the invention to provide rounding off means which is automatically operable in conjunction with one type of machine operation and automatically disabled for other operations.

A further object is to provide means selectively settable to enable or disable the above rounding off means for said one type of operation.

Another object is to provide rounding off means which is particularly adaptable for use in a printing calculator.

Another object is to provide rounding off means for use in a ten key type calculator wherein means is operable to register a series of products around a fixed decimal position.

The invention is disclosed as embodied in a ten key type printing calculator fully disclosed in applicant's copending applications, Serial No. 222,144; Serial No. 338,242; and Serial No. 364,621 and operable in conjunction with the decimal system disclosed in said application, Serial No. 222,144, and with the program of multiplication disclosed in said application, Serial No. 338,242.

The machine of the above applications includes actuator racks operable, in a machine cycle, under control of a selector carriage into which values are set through the ten key keyboard. The actuator racks may be controlled to enter a multiplicand in rotary digital actuators for a product register, or to enter a multiplier in storage devices. Furthermore, the racks may be controlled to enter a value in the product register or to take a total from the register.

The multiplication means of application, Serial No. 338,242, includes the following briefly described operations.

A multiplicand is entered into the selector carriage and a multiplicand entry key is depressed. In response to this key depression, a machine cycle is initiated during which cycle the racks are operable to enter the multiplicand into the rotary digital actuators and printing mechanism is operable to print the multiplicand.

A multiplier is entered into the selector carriage and an equals (=) key is depressed. In response to this key depression, a machine cycle is initiated during which cycle the racks are operable to enter the multiplier into the storage devices and the printing mechanism is operable to print the multiplier.

At the end of the multiplier entering cycle, product registration is automatically initiated during which the rotary actuators and carriage shift means are operated by clutch means which is independently operable of the machine cycling means.

At the conclusion of product registration, a machine cycle is automatically initiated during which a total is taken from the product register and printed.

The present invention provides selectively operable means to modify the above program of operations in response to depression of the equals (=) key. Such modification includes a machine cycle, automatically initiated prior to the multiplier entering cycle, during which one of the racks is operable to enter the value "5" in a given order of the product register; and a machine cycle, automatically initiated subsequent to the product total taking cycle, during which values registered in the orders below the "cents" orders will be cleared from the register. In these two cycles, the printing mechanism is disabled so that the registered values will not be printed. In the product total printing cycle, the totaling mechanism is controlled to prevent totaling and printing of values in the orders below the "cents," zeros being printed in these orders which are cleared in the subsequent cycle as noted above.

Reference is made to said application, Serial No. 338,242, for a complete disclosure of mechanism and operations of the multiplication means herein referred to, but not disclosed in detail, and to application Serial No. 222,144, for a complete disclosure of the decimal system.

Certain machine operations utilized in conjunction with the devices of the invention are not disclosed in said applications, Serial No. 338,242 and Serial No. 222,144, but are disclosed in application, Serial No. 364,621, directed to division mechanism. Specific reference will be made to this application in connection with the description of these operations.

In the following description with reference to the accompanying drawings, parts corresponding to parts disclosed in said applications will be identified by like reference numerals insofar as practical.

In the drawings:

FIGS. 1*a* and 1*b* are a longitudinal section through the machine embodying the invention.

*General description*

Figures 1A, 2:
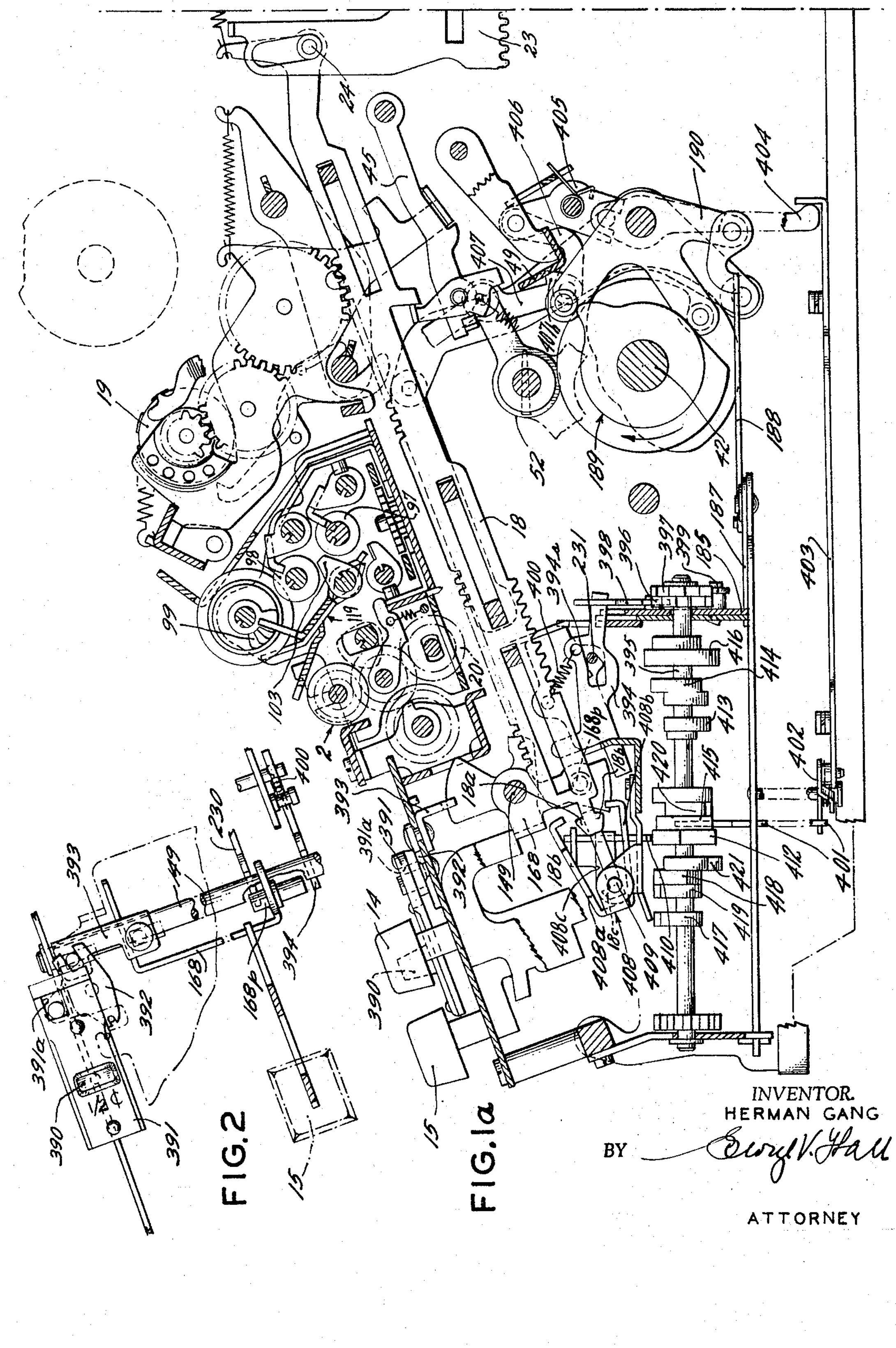
FIG. 2 is a fragmentary plan view of the keyboard.
Figure 1B:
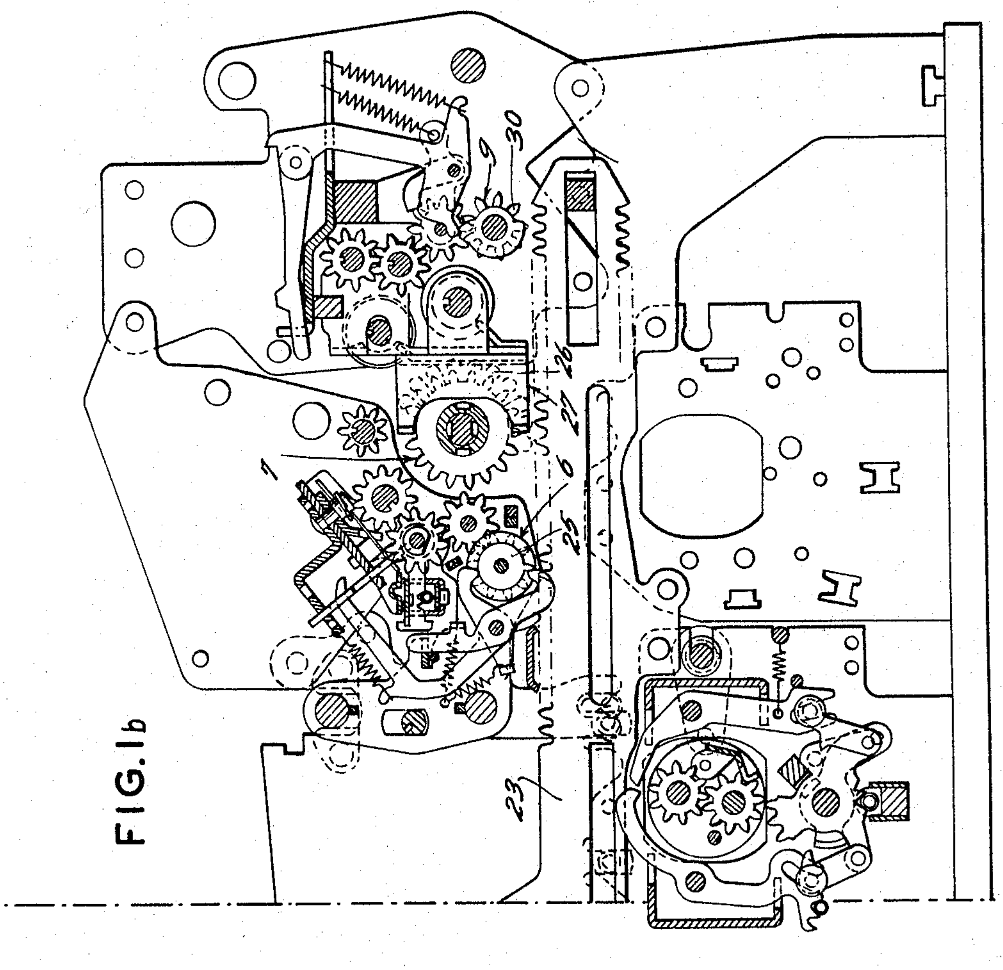

Referring to FIGS. 1*a*, 1*b*, 2, the machine has, at its front, a keyboard including the usual grouping of digit keys (not shown) of the digital values "0 to 9" inclusive for controlling entry of selected values into a selector carriage 2. The keyboard also includes a multiplicand entry key 14, a multiplier entry key 15, and a keybutton 390 selectively settable to enable or disable the rounding off means.

There is an ordinal series of reciprocatory front digital actuator racks 18, and entrained with the racks are digit type wheels 19 of a printing unit.

Selector carriage 2 includes an ordinal series of storage gears 20. Selector carriage 2 is normally positioned, in the usual manner, with the highest order selector gear one ordinal position to the right of the lowest order rack 18. Upon successive depression of the digit keys of the ten key keyboard, the values of the depressed keys respectively are entered into the selector gears from higher to lower orders, and the carriage is step shifted toward the left to bring the set gears 20 successively from higher to lower orders into controlling position with respect to racks 18 from lower to higher orders.

Racks 18 are reciprocably operable in forward and return strokes by means operable during each cycle of a main clutch 41 (FIG. 3) which also operates the printing mechanism. Forward stroke refers to the first stroke of each cycle, as is customary, regardless of the direction with respect to the machine. In this machine the forward stroke of the racks is toward the rear of the machine. A rear digital actuator rack 23 is coupled by roller and slot connection 24 with each front digital actuator rack 18. The pairs of racks 18 and 23 therefore are reciprocated in unison.

Main clutch 41 is of well-known construction wherein the driving member comprising a toothed wheel is adapted to be engaged by a spring urged pawl 41*p* mounted on the driven member which is secured to the machine main drive shaft 42. Normally, a clutch lever 43 is held counterclockwise where it is engaged by a nose of pawl 41*p* to disengage the clutch in full cycle position. Upon clockwise movement of clutch lever 43, pawl 41*p* will be released to engage clutch 41.

A hold-up clutch lever 175 is normally counterclockwise in the rotational path of clutch pawl 41*p* and interrupts operation of clutch 41 at 30° in a cycle. During this 30° step of operation, certain control devices are set in connection with the program of multiplication including the devices of the invention, and subsequently the clutch lever is released to permit the clutch to complete its cycle.

A product register 6 which is nonshiftable comprises an ordinal series of numeral wheels 25. Racks 23 are operable to enter a value into register wheels 25 or to zeroize said wheels in a total taking operation.

A digital actuator unit 7 including an ordinal series of rotary differentially settable digital actuators 26 is driven independently of racks 18 and 23 and is connected with a carriage 27 for ordinal shifting with respect to product register 6 in a program of multiplication. Actuators 26 and shift means for carriage 27 are each driven by a clutch (not shown) which operates independently of main clutch 41. Values may be entered into actuators 26 by racks 23 in accordance with a multiplicand value entered into selector carriage 2.

A nonshiftable multiplier register 9 comprises an ordinal series of storage gears 30. Racks 23 are operable to enter a multiplier value set in selector carriage 2 into gears 30. Counting means shiftable with carriage 27, is operable in a program of multiplication, to count out a multiplier registered in gears 30.

*The decimal system*

The decimal system is selectively settable to provide a given number of decimal digits in the multiplicands and a given number in the multipliers. Upon entry of either of these factors into selector carriage 2, (FIG. 1*a*) a decimal point key (not shown) is depressed in proper sequence with the digit keys and then the function key 14 or 15 is depressed. If the number of decimal digits entered is less than the number called for by the setting, carriage 2 is automatically shifted toward the left, before the machine is cycled, until arrested by stop means thereby adding the number of zeros necessary to complete the number of the setting. Accordingly, all multiplicands are entered and printed around a preselected decimal position and all multipliers are entered and printed around a preselected decimal position. Overcapacity means is operable to prevent operation of the machine if the number of decimal digits entered in carriage 2 exceeds the setting.

The products will be registered and printed around a decimal position which provides for a number of decimal digits equal to the sum of the decimal digit settings for the multiplicands and multipliers.

With reference to FIG. 1*a*, parts of the decimal system are shown including stop drums 97–99 and a stop arm 103 operable in arresting left shift of selector carriage 2. The decimal system, however, as before noted, is fully disclosed in application, Serial No. 222,144.

*Enablement of the program means and initiation of the operation*

Figures 3, 4, 5:
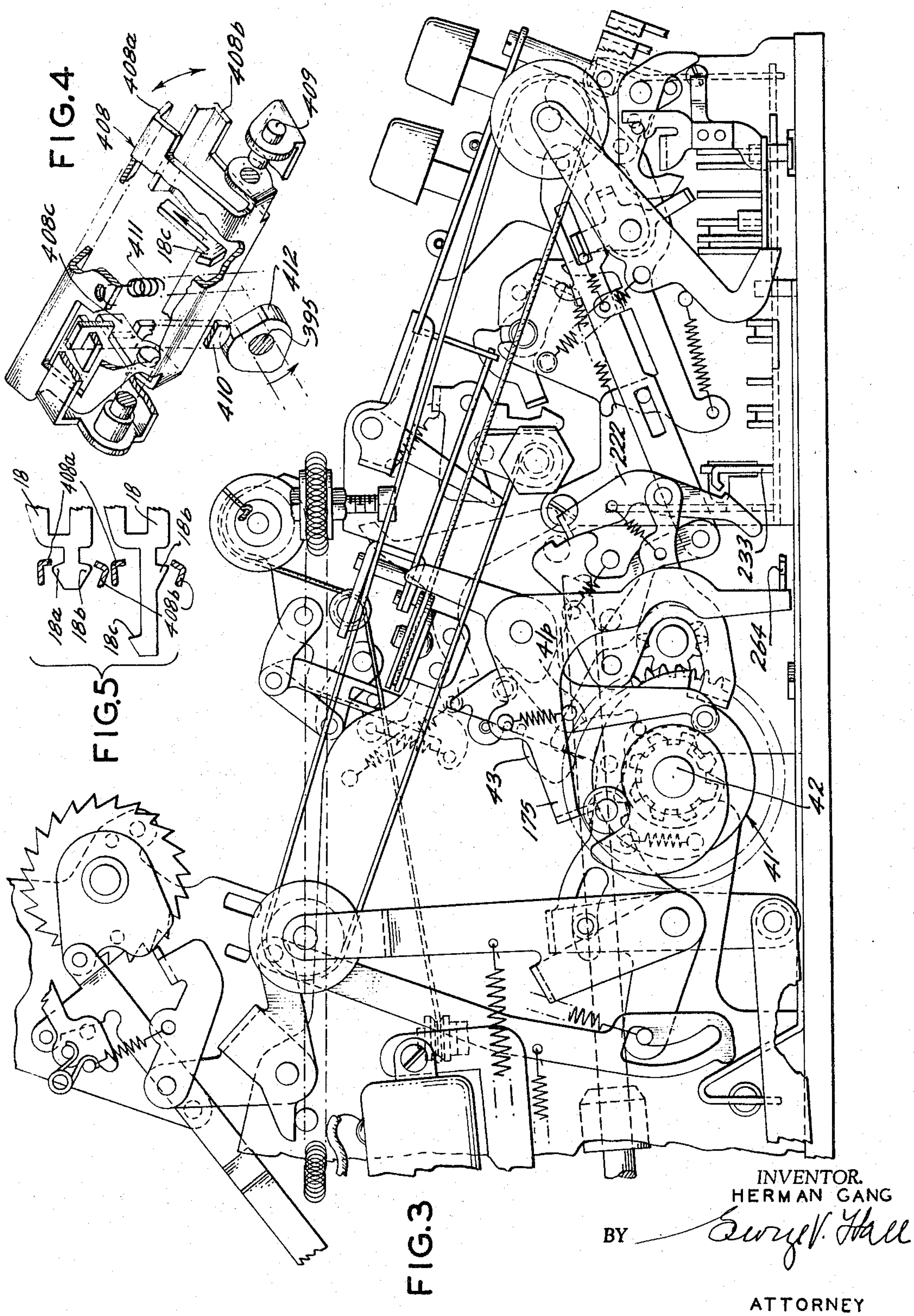
FIG. 3 is a left side view of the front portion of the machine including the main clutch and controls therefor.
FIG. 4 is a fragmentary perspective of the bails for controlling the actuating rack and program means for operating the bails.
FIG. 5 is a mechanical schematic of the actuating racks and control bails.
Figure 6:
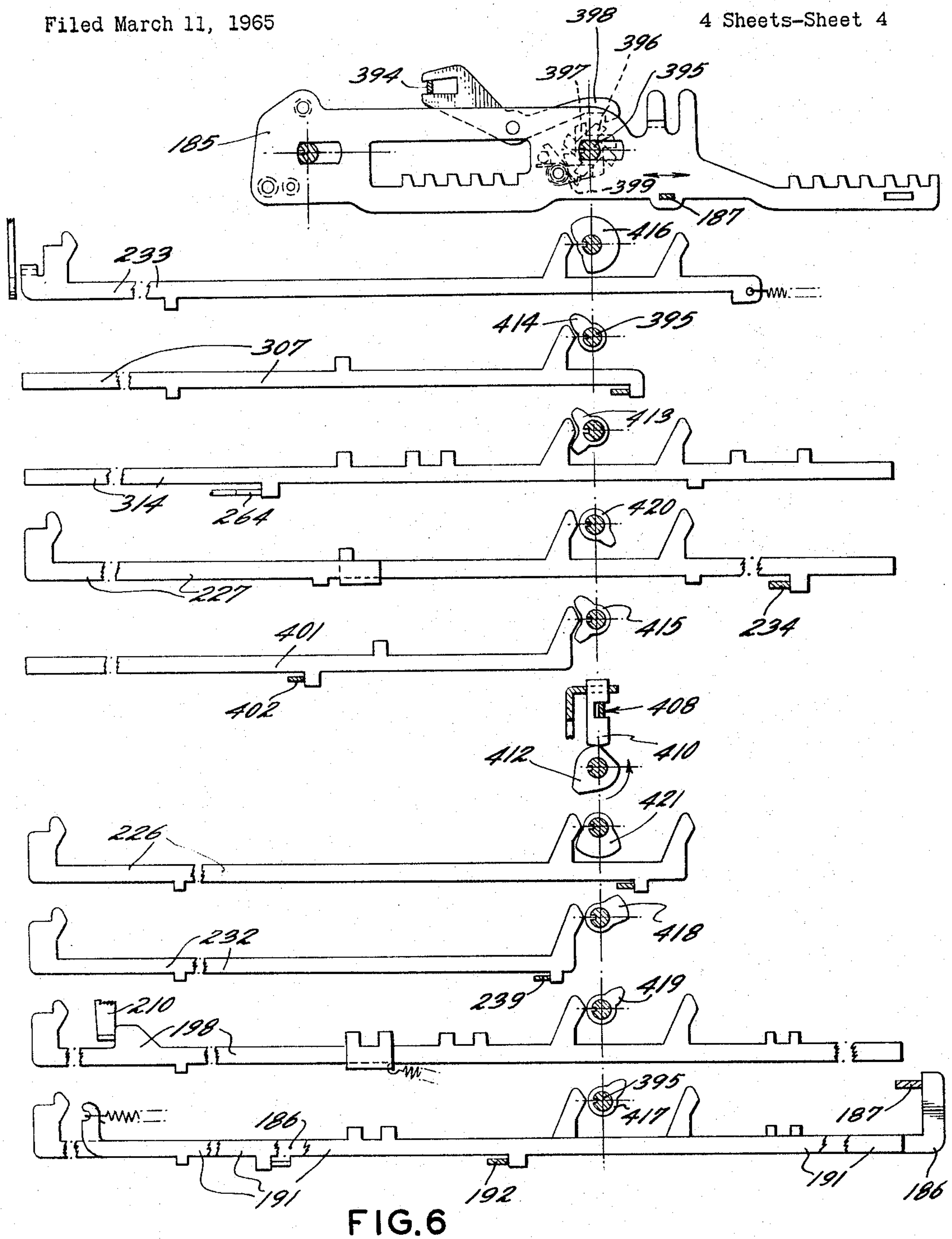
FIG. 6 is a mechanical schematic of the program means.

The program means is operated by a power slide 185 (FIGS. 1*a*, 6) which is reciprocated once for each cycle of main clutch 41 (FIG. 3). Slide 185 extends transversely of the machine below and to the rear of the keyboard in a vertically disposed position, and is adapted for transverse reciprocation by pin and slot mounting on a transverse partition plate.

Means for reciprocating slide 185 upon operation of clutch 41 comprises a bell crank 187 having an end of one arm engaging a slot in the slide and the other arm connected to the front of a rearwardly extending link 188. The rear of link 188 is connected to a depending arm of a cam follower 190 which engages positive action cam means 189 on main drive shaft 42.

Normally, power slide 185 is held toward the right by the above described drive means. Early in each cycle of clutch 41, cam follower 190 is rocked counterclockwise thereby drawing link 188 rearwardly and rocking bell crank 187 to drive slide 185 toward the left. The parts will dwell until near the end of the clutch cycle and then be restored. It will be noted that racks 18, 23 (FIGS. 1*a*, 1*b*) are reciprocated during the dwell period of slide 185.

Means is selectively settable to condition the machine to perform multiplication in the usual manner, or in conjunction with the devices of the invention which perform the rounding off operation.

The conditioning means includes button 390 on a slide 391 (FIGS. 1*a*, 2) which is mounted for front and rear movement on the keyboard. An opening 391*a* adjacent the rear of slide 391 is engaged by a pin on a leftwardly extending arm of a crank 392. Crank 392 has a forked rear arm which is engaged by a pin on a transverse slide 393. Accordingly, when slide 391 is in forward position, crank 392 will be counterclockwise and slide 393 will be toward the left. Conversely, when slide 391 is adjusted rearwardly, from the position of FIG. 2 crank 392 will be clockwise and slide 393 will be to the right. A suitable toggle spring between slide 391 and crank 392 holds the parts in adjusted position.

Slide 393 has a depending edge (FIG. 1a) with an open end slot engaging the end of an upstanding arm of a bail 168 which is rocked counterclockwise on a shaft 149 upon depression of equals key 15. Bail 168 is longitudinally shiftable on shaft 149 and, therefore, is transversely adjustable with slide 393.

When slide 391 is forward and bail 168 toward the left, a leftwardly extending end of a pin 168*p* on a depending arm of the bail will be in operating relationship with respect to a rearwardly extending slide 230. When bail 168 is rocked upon depression of key 15, slide 230 will be operated to enable drive means operated by power slide 185 for a program shaft 224 (not shown). Mounted on shaft 224 is cam means which operates program slide 186, 191, 198, 226, 227, 232 and 233 (FIG. 6) in conjunction with the usual program of multiplication.

With bail 168 adjusted to the left as described above, a rightwardly extending end of pin 168*p* will be to the left (FIG. 2) and out of operating position with respect to a rearwardly extending slide 394 similar to slide 230. However, with button 390 and slide 391 in rear adjusted position, bail 168 will be to the right of the position of FIG. 2 and the right end of pin 168*p* will be in operating position with respect to slide 394 whereas the left end of the pin will be removed from position to operate slide 230. The machine will now be conditioned to perform the rounding off operation in conjunction with product registration.

With the machine conditioned for the rounding off operation, depression of key 15 will rock bail 168 counterclockwise to enable the program means. Furthermore, main clutch 41 (FIG. 3) will be engaged and key 15 latched depressed.

The program means includes a program shaft 395 (FIGS. 1*a*, 6) extending front and rear with its rear end passing through a slot in power slide 185 thereby supporting said slide. Normally disabled means is operable to step shaft 395 a 45° turn counterclockwise during the leftward movement of slide 185 and another 45° turn when the slide is restored.

The means for stepping shaft 395 comprises a pair of ratchet wheels 396, 397 fast on shaft 395 to the rear of power slide 185. Each wheel has four teeth and the wheels are displaced 45° on the shaft from each other. A feed pawl 398 is pivotally mounted on the rear of slide 185 in the plane of wheel 396 and has its right operating end normally above said wheel immediately to the right of a tooth. A feed pawl 399 is pivotally mounted on the rear of slide 185 in the plane of wheel 397 and is spring biased counterclockwise to engage its right operating end with the underside of said wheel immediately to the left of a tooth. Normally, when slide 185 is reciprocated, pawl 398 will move idly above wheel 396 and pawl 399 will slide idly on the side of a tooth of wheel 397. Depression of key 15, however, will enable pawls 398, 399 as follows.

A leftwardly extending arm of pawl 398 has a horizontal slot. The rear end of previously noted slide 394 engages the slot and is supported adjacent its front end by a transverse bracket. A cam slot 394*s* is located intermediate the ends of slide 394 and is engaged by a fixed transverse rod 231. Normally, a spring 400 holds slide 394 forwardly with its rear urged upwardly and the rear of cam slot 394*s* engaging rod 231 to hold the rear of said slide lowered and the right operating end and pawl 398 raised in idly operable position.

When key 15 rocks bail 168, pin 168*p* will engage an upper projection of slide 394 and move said slide rearwardly. As slide 394 is moved rearwardly, cam slot 394*s* will permit spring 400 to raise the rear of the slide thereby rocking pawl 398 clockwise to lower its right end to a position immediately to the right of a tooth of wheel 396. Therefore, upon leftward movement of slide 185, pawl 398 will engage a tooth of wheel 396 and rotate shaft 395 45° counterclockwise; and at the same time pawl 399 will be moved to the left and rocket counterclockwise to position its operating end immediately to the left of a tooth of wheel 397. As a result, when slide 185 is restored, pawl 399 will engage a tooth of wheel 397 and step shaft 395 another 45° counterclockwise. Suitable detent means (not shown) is operable to hold shaft 395 in its adjusted positions.

As later described, the program in response to depression of key 15 includes four cycles of clutch 41 and, therefore, program shaft will be rotated a full turn in eight 45° steps of movement.

*Program means operated by the program shaft*

The program means operable by program shaft 395 (FIGS. 1*a*, 6) includes a number of program slides also operable in the usual program of operations and additional program means later described. The program slides operable in the normal program of operations will be briefly described first with reference to the slides in numerical sequence regardless of the timing of operations later described. The slides are normally all held toward the right by appropriate spring means and are moved to left operated position by cam means later described.

Slide 186 when moved to the left operates means to release escapement mechanism for selector carriage 2 which will then be left shifted until arrested by the shift limiting means 97, 103 of the decimal system. As an incident to the arrest of the carriage, means is operated to release hold-up clutch lever 175 (FIG. 3) so that clutch 41 will continue its operation. If the number of decimal digits equals the setting of the shift limiting means, a further small movement of the carriage will be permitted by the shift limiting means which movement releases hold-up clutch lever 175.

Movement of slide 191 to the left enables means operable in a cycle of clutch 41 to control engagement and disengagement of selector gears 20 of carriage 2 with racks 18 thereby controlling the excursions the racks in accordance with the values entered in the gears.

Movement of slide 198 toward the left operates means to permit uncoupling of selector carriage 2 and a stop carriage 119 which carries stop arms 103 of the decimal system. When the carriages are uncoupled, the stop carriage is restored to right independently by spring means whereas carriage 2 is restored after completion of the forward strokes of racks 18, 23 and operation of the printing mechanism.

Movement of slide 226 to the left enables means operable in a cycle of clutch 41 to control engagement and disengagement of product register 6 (FIG. 1*b*) with racks 23 to take a total.

Leftward movement of slide 227 operates means to initiate product registration.

Movement of slide 232 to the left enables means operable in a cycle of clutch 41 to control engagement and engagement of multiplier storage register 9 with racks 23 to enter a value in said storage means, and to set control devices operable in product registration.

Movement of slide 233 to the left is operable to disable a lever 222 (FIG. 3) which is normally operable to move clutch lever 43 to clutch disengaging position and to retract key 15.

Movement of slide 307 to the left enables means operable in a cycle of clutch 41 to control engagement and disengagement of product register 6 with racks 23 to enter a value in said register. This operation is fully disclosed in said application, Serial No. 364,621.

Movement of slide 314 to the left operates means including a bell crank 264 to disable hold-up clutch lever 175 so that clutch 41 will complete a cycle without interruption. This operation is disclosed in said applications Nos. 222,144 and 364,621.

The additional program means includes a slide 401. Movement of slide 401 to the left disables the printing mechanism (FIG. 1*a*). Slide 401 has a depending lug which engages the right side of a forwardly extending arm of a bell crank 402 which is spring biased counterclockwise. A rightwardly extending arm of crank 402 is connected to the front of a rearwardly extending slide 403.

Slide 403 has an upstanding lug at its rear end which engages the end of a depending arm of a lever 404 which has an upstanding arm having pin and slot connection with a depending arm of a lever 405 spring biased clockwise. An upstanding arm of lever 405 has link connection 406 with the lower end of a vertically disposed link 407 which is connected at its upper end to a cam follower 52 engaging cam means 50 (not shown) on main drive shaft 42.

Link 407 has a rearwardly extending hook **407*h* at its lower end which normally is located beneath an under edge of a bail 49. During each cycle of clutch 41, follower 52 will be rocked counterclockwise and restored thereby raising and lowering link 407 and bail 49. When bail 49 is raised, it will trip latch arms 45 of all orders of the printing mechanism wherein the associated racks 18** have moved from zero position so that the printing mechanism will be operated.

When program slide 401 is moved to the left, bell crank 402 will be rocked to move slide 403 forwardly. This will rock lever 404 clockwise and lever 405 counterclockwise thereby moving link 406 forwardly and hook **407*h* forwardly from beneath the under edge of bail 49. Therefore, link 407 will be idly raised and lowered in front of bail 49** and the printing mechanism will be disabled.

The rounding off means is adapted for operation with the "cents" registered in the seventh and eighth orders of product register 6. The decimal system, therefore, will be set so that the sum of the decimal digits in the factors equals "8," and the program means will be operable to enter the "5" in the sixth or "mills" order. Additional program means comprising bails means 408 (FIGS. 1*a*, 4, 5, 6) is operable in connection with the above.

Bail means 408 extends transversely across the machine and comprises an upper bail **408*a* and a lower bail 408*b* spaced downwardly from said upper bail. Bails 408*a*, 408*b* include rearwardly extending arms which are connected by an integral transverse strip and thereby form a unit which is pivotally mounted at its front on a fixed transverse shaft 409**.

A cam follower in the form of a vertical plunger 410 has slot connection with a rearwardly extending arm **408*c* of bail means 408. A spring 411 urges bail means 408 clockwise and follower 410 into engagement with a cam 412 fast on program shaft 395. Normally, follower 410 engages an intermediate part of cam 412 and bail means 408 is held in an intermediate or central position as shown in the drawings. Cam 412 also includes a low part and a high part which controls adjustment of bail means 408** to respective lowered and raised positions.

Bail **408*a* is operable to block all racks 18 except the sixth order from forward stroke movement, and to limit the sixth order to five digital steps of movement to thereby register "5" in the sixth order of product register 6**.

Bail **408*b* is operable to block only the six lowest order racks 18** from forward stroke operation. A total, therefore, may be taken to print a product without significant digits to the right of the "cents" orders. In these orders to the right, zeros will be printed because the racks are restrained from totalizing operation.

For cooperation with bails **408*a* and 408*b*, racks 18, except the sixth order, have front extensions comprising upper lugs 18*a* and lower opposed lugs 18*b*. A forward extension of the sixth order rack has a lower lug 18*b* corresponding to the other lugs 18*b*, but in lieu of a lug 18*a*, the rack has an upper lug 18*c* located a distance of five digital steps of movement forwardly of lugs 18*a*, 18*b***.

When bail means 408 is in normal central position a lower edge of upper bail **408*a* extends transversely above and immediately to the rear of all lugs 18*a* of racks 18; and an upper edge of lower bail 408*b* extends transversely below and immediately to the rear of lugs 18*b* of only the six lowest order racks 18**.

When bail means 408 is rocked clockwise, the edge of bail **408*a* will be lowered to a position immediately to the rear of lugs 18*a* thereby blocking forward stroke movement of the associated bails 18. The sixth order rack, however, will be allowed five digital steps of movement by lug 18*c* which will then engage bail 18*a*** and block the rack from further movement.

When bail means 408 is rocked counterclockwise, the edge of bail **408*b* will be raised to a position immediately to the rear of lugs 18*b* of the six lowest order racks 18** thereby blocking forward stroke movement of those racks but allowing forward stroke movement of all higher order racks.

*Operation*

The decimal system will be adjusted for eight decimal digits in the products. After entry of a multiplicand into digital actuator unit 7 (FIG. 1*b*) a multiplier is entered into selector carriage 2 (FIG. 1*a*) and multiplier equals key 15 is depressed. Main clutch 41 (FIG. 3), therefore, will be engaged, the drive from power slide 185 (FIG. 6) to program shaft 395 will be enabled, and key 15 will be latched depressed. It will be recalled that, in response to the single depression of key 15, there will be four cycles of clutch 41 and eight 45° counterclockwise steps of program shaft 395. The operation with reference to each clutch cycle follows.

*Operation (1st clutch cycle, ½ cent entering)*

Early in the cycle, program shaft 395 (FIGS. 1*a*, 6) will be given its first step of movement to perform the following operations:

A lobe of a cam 413 on shaft 395 will engage an upstanding lug on program slide 314 to move and hold the slide to the left. Therefore, hold-up clutch lever 175 (FIG. 3) will be disabled so that clutch 41 will continue in the cycle.

The low part of cam 412 on shaft 395 will engage follower 410, and therefore bail means 408 will be rocked clockwise to bring the edge of bail **408*a* into blocking position with respect to lugs 18*a* of racks 18. As a result, all racks 18 except the sixth order will be blocked from operation in the clutch cycle. However, lug 18*c* of the sixth order rack 18 is five digital steps of movement from bail 408*a*, and thus the connected rack 23** (FIG. 1*b*) will be operated to register the digit "5" in the sixth order wheel 25 of product register 6.

A lobs of a cam 414 on shaft 395 will engage an upstanding lug on slide 307 to move and hold the slide to the left. Therefore, engagement and disengagement of register 6 with respect to racks 23 will be controlled in the cycle for entry of the "5" into the sixth order of the register.

A lobe of a cam 415 on shaft 395 will engage an upstanding lug of slide 401 to move and hold the slide to the left. The printing mechanism will, therefore, be disabled in the cycle and the "5" entered into product register 6 will not be printed.

A high part of a cam 416 on shaft 395 will engage an upstanding lug on slide 233 to move and hold the slide to the left to disable the full cycle disengaging means for clutch 41. Clutch 41, therefore, will not be disengaged at the end of the cycle but will continue into the next cycle.

Near the end of the cycle, shaft 395 will be given its second step to perform the following operations.

Cam 416 will continue to hold slide 233 to the left so that the full cycle disengaging means for clutch 41 will remain disabled.

Cam 414 will permit slide 307 to be restored. Therefore, the means for controlling product register 6 for entry of values by racks 23 will be disabled for operation in the following cycle.

Cam 413 will permit slide 314 to be restored. Therefore, hold-up clutch lever 175 will be enabled for operation in the next cycle.

Cam 415 will permit slide 401 to be restored. The printing mechanism will, therefore, be enabled so that the multiplier will be printed in the next cycle.

Cam 412 will engage its intermediate part with follower 410. This will restore cam means 408 to normal central position where racks 18 will not be blocked in the following multiplier entering cycle.

*Operation (2nd cycle, multiplier entering)*

Early in the cycle, program shaft 395 will be given its third step of movement to perform the following operations.

Cam 416 will continue to hold slide 233 to the left so that clutch 41 will not be disengaged at the end of the cycle but will continue into a 30° step in the next or product printing cycle where it will be arrested by hold-up clutch lever 175.

A lobe of a cam 417 on shaft 395 will engage an upstanding lug on slide 186 to move and hold the slide to the left. This operates the escapement to release selector carriage 2 for left shift movement. This movement in conjunction with the shift limiting means of the decimal system releases hold-up latch 175 so that clutch 41 will continue in the cycle to enter the multiplier.

Slide 191 is moved to the left with slide 186. This enables means operable in the cycle to control selector carriage 2 to control the excursions of racks 18 in accordance with the multiplier value entered in the carriage.

A lobe of a cam 418 on shaft 395 engages an upstanding lug on slide 232 to move and hold the slide to the left. This enables the means operable in the cycle to control the engagement and disengagement of register 9 with racks 23 for entry of the multiplier.

A lobe of a cam 419 engages an upstanding lug of slide 198 to move and hold the slide to the left. This enables means operable in the cycle to uncouple selector carriage 2 from stop carriage 119 of the decimal system so that the carriages may be restored independently in the cycle to right home position.

Near the end of the cycle, shaft 395 will be given its fourth step to perform the following operations.

Cam 416 will continue to hold slide 233 to the left so that clutch 41 will not be disengaged at the end of the cycle but will continue into a 30° step in the next or product printing cycle where it will be arrested by hold-up clutch lever 175.

The lobe of cam 418 will continue to hold slide 232 toward the left. This enables means operable near the end of the cycle to perform certain setting operations in connection with product registration.

The lobe of cam 417 releases slide 186 which will be restored.

Slide 191 will be restored with slide 186.

The lobe cam 419 will release slide 198 which will be restored.

*Operation (3rd cycle, product printing with rounding off)*

Early in the cycle, program shaft 395 will be given its fifth step of movement to perform the following operations. In this cycle, clutch 41 will be arrested, after the 30° step, by clutch lever 175.

Cam 416 will continue to hold slide 233 to the left so that the full cycle disengaging means for clutch 41 will remain disabled.

Cam 418 permits slide 232 to be restored.

A lobe of a cam 420 on shaft 395 will engage an upstanding lug of slide 227 to move and hold the slide to the left to initiate product registration.

The high part of cam 412 engages follower 410 to adjust bail means 408 counterclockwise. This will bring the edge of bail **408*b* in blocking position with respect to lugs 18*b* of racks 18** below the "cents" orders to prevent product totaling and printing of significant digits below the cents orders.

A lobe of a cam 421 will engage an upstanding lug of slide 226 to move and hold the slide to the left. Therefore, when clutch 41 is engaged to continue the cycle, means is operable to control the engagement and disengagement of product register 6 with racks 23 to take a product total.

When product registration is complete, means is operable to release hold-up clutch lever 175 to engage clutch 41 to continue the cycle during which a product total is taken and printed with the amount rounded off to the nearest cent and with zeros printed to the right of the "cents" orders.

Near the end of the cycle, shaft 395 will be given its sixth step to perform the following operations.

Cam 416 will continue to hold slide 233 to the left so that the full cycle disengaging means for clutch 41 will remain disabled and the clutch will continue in a total taking cycle to remove the significant digits below the "cents" orders from register 6.

Cam 421 will continue to hold slide 226 to the left so that in the following cycle of clutch 41 a total will be taken from register 6.

Cam 420 will permit slide 227 to be restored.

The intermediate part of cam 412 engages follower 410. Bail means 408, therefore, is restored to normal central position wherein bails **408*a*, 408*b*, are ineffective to block racks 18** in the total taking operation of the next cycle.

*Operation (4th cycle, register clearing)*

Early in the cycle, program shaft 395 will be given its seventh step of movement to perform the following operations.

Cam 421 will continue to hold slide 226 to the left so that a total will be taken from product register 6. This will remove the significant digits below the "cents" orders.

Cam 416 will permit slide 233 to be restored. This will enable the full cycle stopping means for clutch 41 which will, therefore, be disengaged at the end of the cycle.

A second lobe of cam 413 will move and hold slide 314 to the left to disable hold-up clutch lever 175 so that clutch 41 will continue uninterrupted in the cycle.

A second lobe of cam 415 will move and hold slide 401 to the left to disable the printing mechanism. Therefore, the significant digits below the "cents" orders cleared from register 6 will not be printed.

Near the end of the cycle, shaft 395 will be given its eighth step and cams 413, 415 and 421 will permit respective slides 314, 401, and 226 to be restored. Accordingly, all of the parts will have been restored to the normal positions of FIG. 6.

When clutch 41 is disengaged at the end of the cycle, key 15 will be released and the drive means 398, 399 for program shaft 395 will be disabled.

It will be noted that the means for registering the "5" in the product register 6 is operable prior to product registration rather than after. This is necessary in applicant's machine because there is no tens transfer mechanism operable in conjunction with registration in register 6 by racks 23 but only with registration by actuator unit 7. Most machines, however, do have tens transfer mechanism operable in conjunction with registering racks and in such machines the time of entry of the "5" (before or after product registration) would be a matter of expediency. It will be understood, therefore, that the timing of the program means could be modified for operation to control entry of the "5" after product registration without departing from the principles of operation of the invention.

Furthermore, it will be obvious that the timing could be modified to reverse the sequence of the two total taking cycles following product registration. In such instance, the structure of bail **408*b* would be modified to block operation of racks 18** in the orders above the order in which the "5" is entered.

The devices of the invention have been disclosed as operating in conjunction with a decimal system in a ten key machine. Obviously, the invention would be operable without the decimal system wherein zeros are entering into the selector carriage by depression of the zero key to bring the carriage to the correct ordinal positions for factor entry.

The invention is disclosed as adapted for rounding off in the registration of cents. Obviously, the invention is equally applicable wherein a rounding off operation is desirable in conjunction with the registration of other values.

Furthermore, it will be understood that the invention is equally adaptable for use in a full keyboard type of machine wherein factors are entered in the keyboard around a fixed decimal position. Also, certain features of the invention may be embodied in a non-printing calculator.

Also, it will be understood that the order which is rounded off in the register is a matter of expediency.

The invention, therefore, is to be restricted only as necessitated by the scope and spirit of the appended claims.

I claim:

1. In a calculating machine having a register; and
means operable to accumulate amounts in an ordinally related position with respect to a given order in said register;
rounding off means including
means for entering a given value in said given order of said register;
means for clearing said given order and all lower orders of said register to zero independently of the higher orders; and
program means automatically operable to control operation of said entering means and said clearing means.

2. The invention according to claim 1 wherein:
said accumulating means is automatically operable; and
said program means is automatically operable to control operation of said entering means, said accumulating means, and said clearing means.

3. The invention according to claim 2 wherein:
said program means is operable to control sequential operation of said entering means, said accumulation means, and said clearing means.

4. In a calculating machine having a register;
means for entering values into said register;
total taking means for clearing said register;
printing mechanism operable to print values entered into or cleared from said register; and
means operable to accumulate amounts in an ordinally related position with respect to a given order of said register:
rounding off means including
means for controlling said value entering means to enter a given value into said given order of said register;
means for controlling said total taking means to clear all orders higher than said given order of said register independently of said given and the lower orders;
means for controlling said total taking means to clear said given and lower orders of said register independently of said higher orders; and
program means automatically operable to control operation of said value entering means under control of said means for entering said given value, and two operations of said total taking means respectively under control of the first said and second said total taking control means.

5. The invention according to claim 4 wherein:
means is operatble to disable said printing mechanism; and
said program means is operable to control operation of said disabling means upon operation of said value entering means in entry of said given value and upon operation of said total taking means under control of said second said total taking control means.

6. The invention according to claim 5 wherein:
said accumulating means is automatically operable; and
said program means is automatically operable to control operation of said accumulating means.

7. The invention according to claim 6 wherein:
said program means is operable to control operation of said entering means prior to operating of said accumulating means.

8. The invention according to claim 6 wherein:
said program means is operable to control operation of the first said control means for said total taking means prior to operation of the second said control means for said total taking means.

9. The invention according to claim 6 wherein:
said program means is operable to control operation of said entering means prior to operation of said accumulating means, and sequential operation of the first and second said control means for said total taking means subsequent to operation of said accumulating means.

10. In a calculating machine having a register;
reciprocably operable differential actuating racks operable to enter values into the respective orders of said register or to clear said register orders to zero;
printing mechanism operable to print the values entered into or cleared from said register;
means for disabling said printing mechanism; and
means automatically operable to accumulate amounts in an ordinally related position with respect to a given order of said register:
rounding off means including
means for controlling the rack associated with said given order of said register to enter a given value into said given order and for controlling said means for disabling said printing mechanism;
means for controlling said racks in a total taking operation to clear all orders higher than said given order of said register independently of said given and the lower orders;
means for controlling said racks in a total taking operation to clear said given and the lower orders of said register independently of said higher orders and for disabling said printing mechanism; and
program means automatically operable to control operation of said means for controlling the rack associated with said given order of said register and for controlling said means for disabling said printing mechanism, said means automatically operable to accumulate, and the two said means for controlling said racks in respective total taking operations.

11. The invention according to claim 10 wherein:
said program means is operable to perform said control operations in the enumerated sequence.

12. The invention according to claim 10 wherein:
said means for controlling the rack associated with said given order of said register includes means operable to limit forward stroke movement of said rack to a distance corresponding to said given value and to restrain all other racks from forward stroke operative movement; and
said means for controlling said racks in said two total taking operations includes means for restraining said rack associated with said given order of said register and all lower order racks from forward stroke operative movement.

13. The invention according to claim 12 wherein:
said means for controlling the rack associated with said given order includes a bail; and
said means for controlling said racks in said two total taking operations including a bail.

14. The invention according to claim 13 wherein:
said racks are provided with lugs adapted for restraining engagement with said bails.

15. The invention according to claim 13 wherein:
said bail for controlling said racks in said two total taking operations is moved to effective position for the first said total taking operation and moved to ineffective position for the second said total taking operation.

16. The invention according to claim 15 wherein:
said machine includes multiplying mechanism having multiplier entry means;
said means automatically operable to accumulate amounts comprises product registration; and
said program means is operable to control operation of said multiplier entry means prior to operation of said accumulating means.

17. The invention according to claim 10 wherein:
drive means including a cyclically operable clutch is provided for said racks and said printing mechanism;
manually operable means is provided to effect initial engagement of said clutch;
means operated by said clutch is provided to operate said program means;

means operated by said program means is provided to control three cycles of said clutch to effect said value entering operation of said rack associated with said given order of said register and the two said total taking operations.

References Cited

UNITED STATES PATENTS

| | | | |
|---|---|---|---|
| 2,214,014 | 9/1940 | Dreher | 235—60 |
| 2,328,611 | 9/1943 | Bryce et al. | 235—61.6 |
| 3,076,597 | 2/1963 | Gelling | 235—61 |

STEPHEN J. TOMSKY, *Primary Examiner.*

PO-1050
(5/69)

UNITED STATES PATENT OFFICE
CERTIFICATE OF CORRECTION

Patent No. 3,332,618 Dated July 25, 1967

Inventor(s) Herman Gang

It is certified that error appears in the above-identified patent and that said Letters Patent are hereby corrected as shown below:

Column 6, line 46, "engagement" should be --disengagement--

SIGNED AND
SEALED

DEC 9 - 1969

(SEAL)
Attest:

Edward M. Fletcher, Jr.
Attesting Officer

WILLIAM E. SCHUYLER, JR.
Commissioner of Patents